Feb. 17, 1948.   F. J. CADENAS   2,436,162
X-RAY FILM VIEWER
Filed Feb. 16, 1944   5 Sheets-Sheet 3

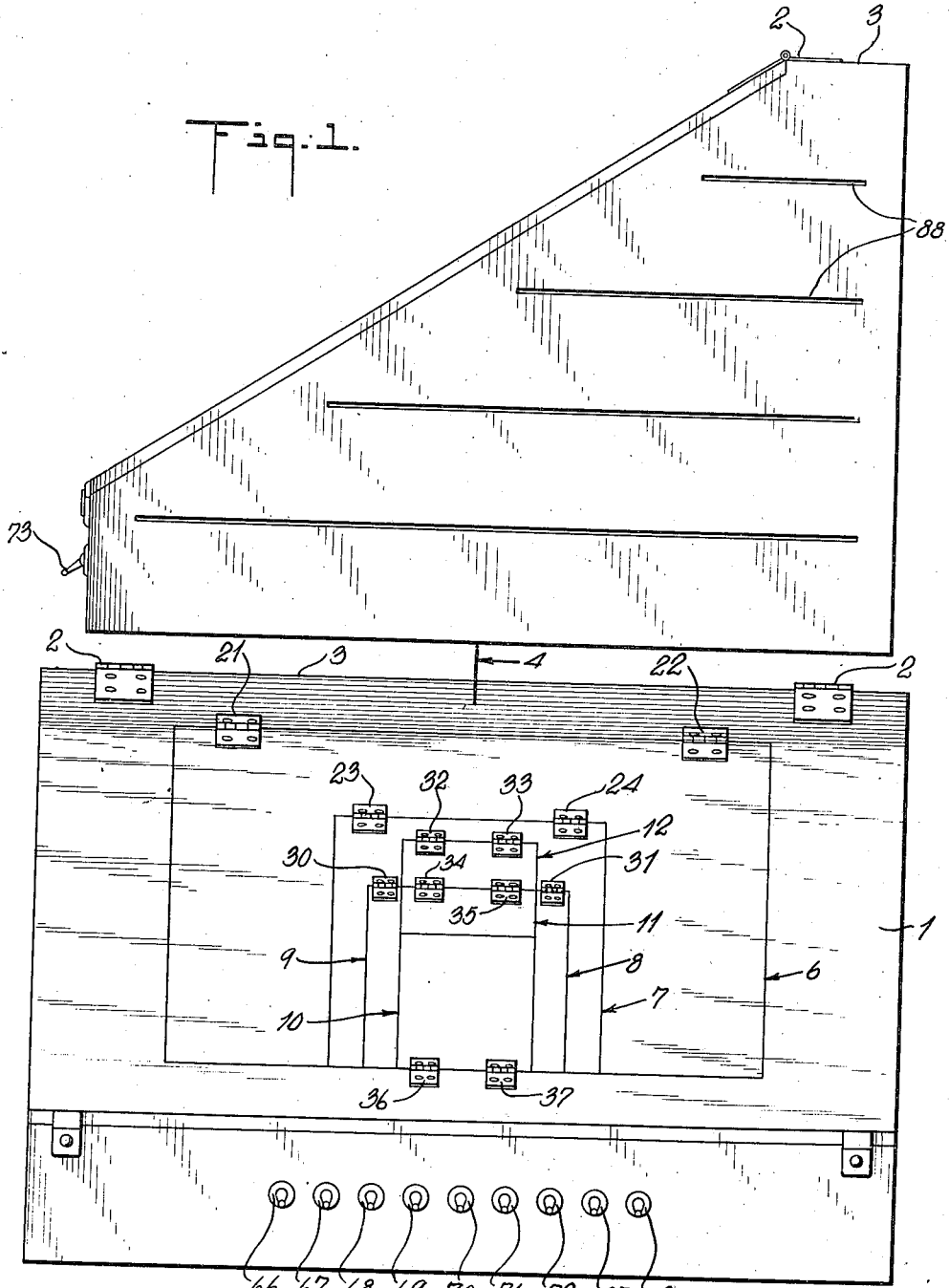

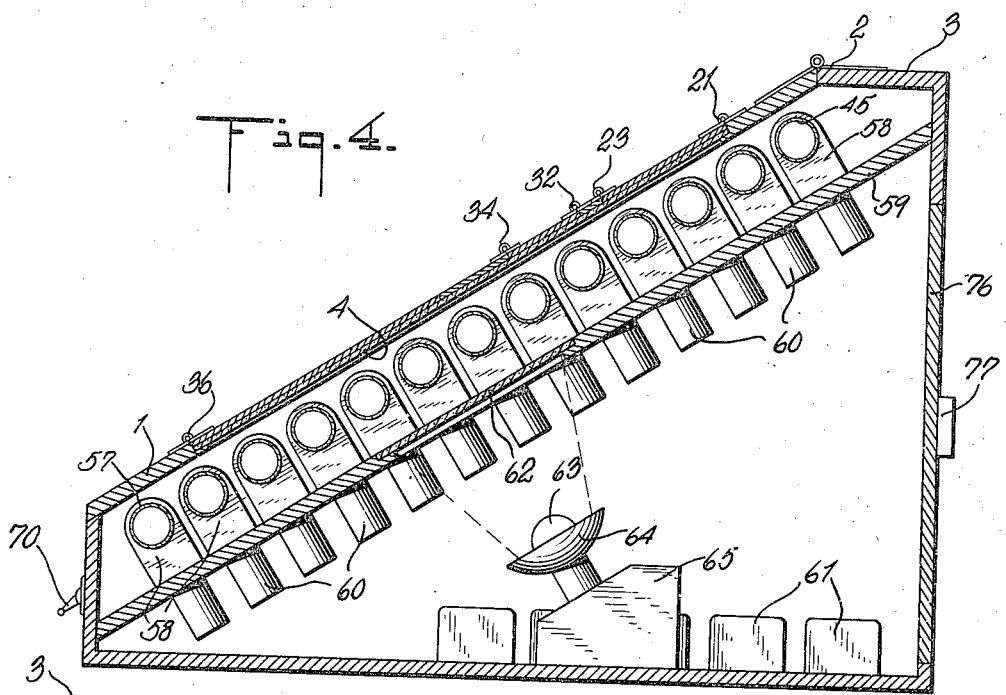
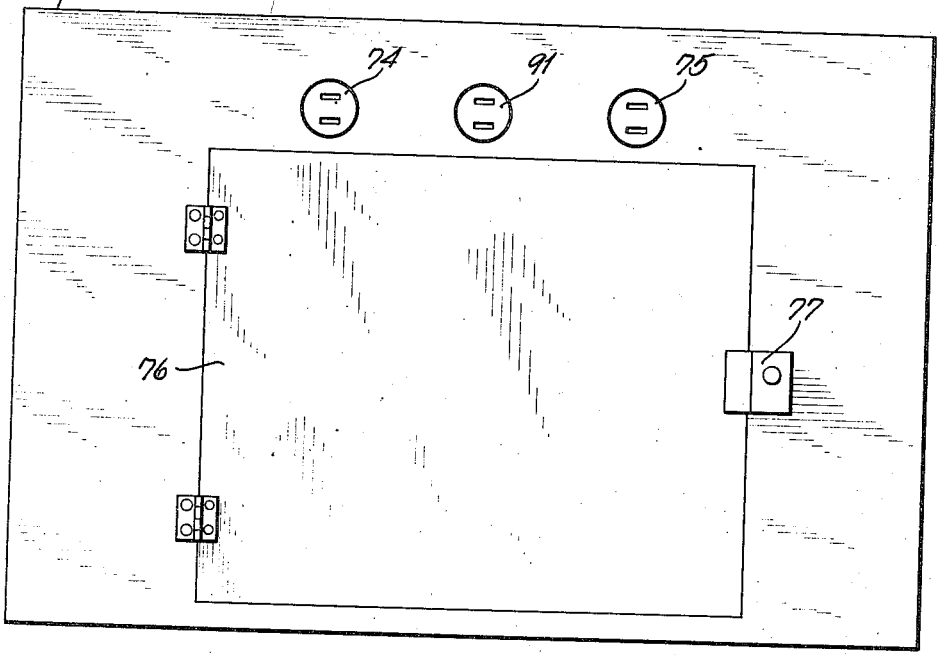

INVENTOR
FERNANDO J. CADENAS
BY John J. Rogan
ATTORNEY

INVENTOR
FERNANDO J. CADENAS
BY John J. Rogan
ATTORNEY

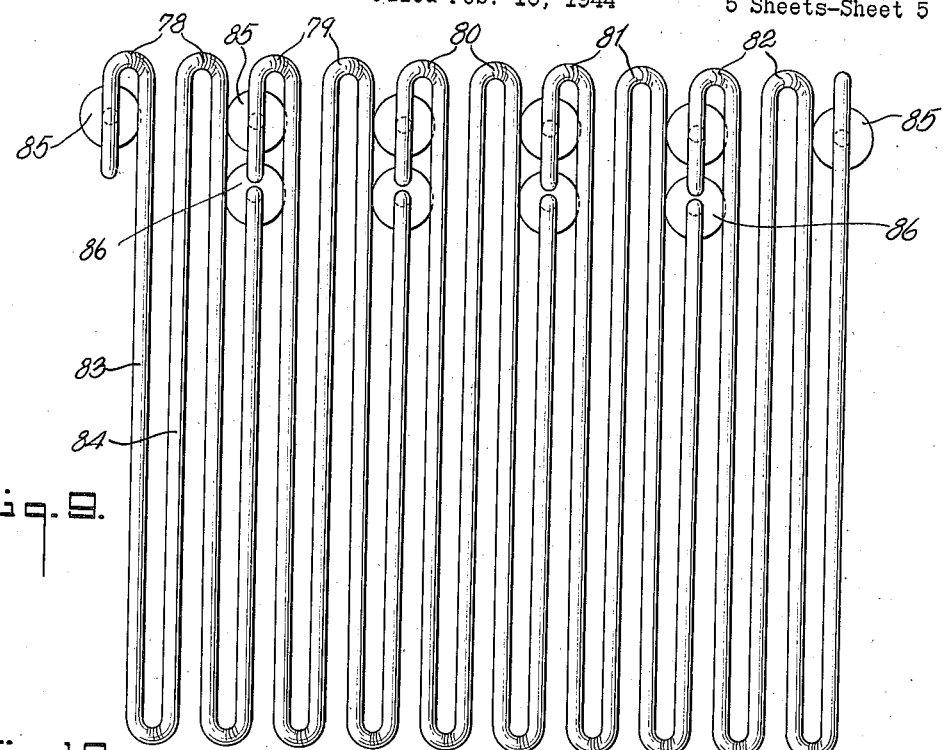
Fig. 9.
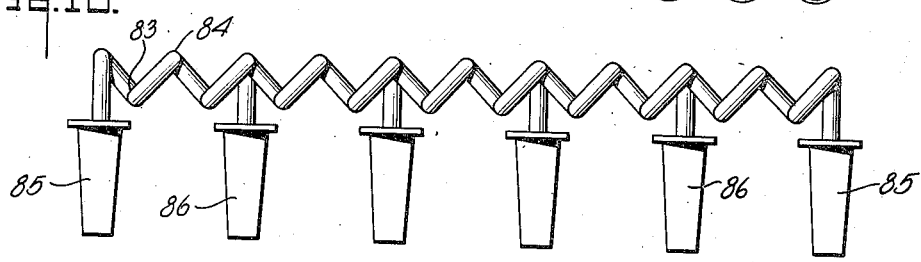
Fig. 10.
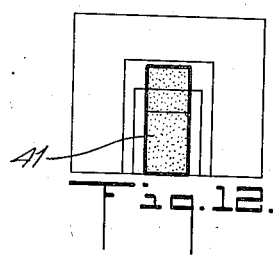
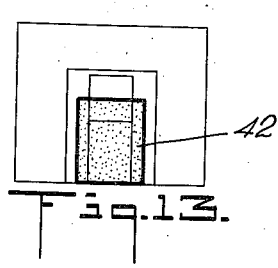
Fig. 11.   Fig. 12.   Fig. 13.
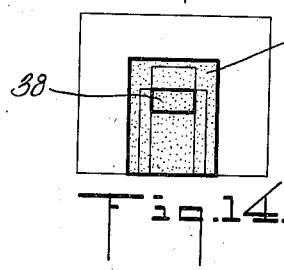
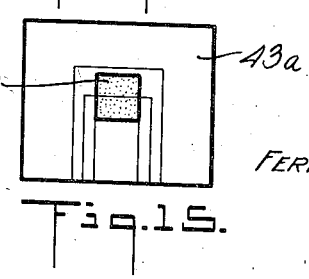
Fig. 14.   Fig. 15.
INVENTOR
FERNANDO J. CADENAS
BY John J. Rogan
ATTORNEY Patented Feb. 17, 1948

2,436,162

UNITED STATES PATENT OFFICE 2,436,162

X-RAY FILM VIEWER

Fernando J. Cadenas, Forest Hills, N. Y., assignor to Sylvania Electric Products Inc., Emporium, Pa., a corporation of Massachusetts Application February 16, 1944, Serial No. 522,677

5 Claims. (Cl. 40—132)

1

This invention relates to film viewers and more especially to a device for inspecting or viewing photographic transparencies.

A principal object of the invention relates to an improved viewer for X-ray negatives and the like.

Another object relates to a variable viewing mask for film viewers.

A further object relates to an improved lighting arrangement for examining X-ray transparencies and the like, whereby the accuracy of diagnostic examination or interpretation is materially facilitated.

A feature of the invention relates to an X-ray transparency viewer which is capable of use with a wide variety of transparency sizes, without sacrificing the intensity or efficiency of illumination through the transparency.

Another feature relates to an improved X-ray transparency viewer, employing a novel arrangement of fluorescent illuminants.

A further feature relates to an X-ray film viewer employing a special combination of fluorescent and incandescent illuminants.

A further feature relates to an X-ray film viewer having a large area of illumination capable of uniformly illuminating all standard sizes of X-ray negatives, in conjunction with a special arrangement for producing a concentrated illumination at a localized area of any given negative.

A further feature relates to the novel organization, arrangement and relative location of parts which cooperate to provide an improved film viewer for X-ray transparencies and the like.

Other features and advantages not specifically enumerated will be apparent after a consideration of the following detailed descriptions and the appended claims.

In the drawing which illustrates certain embodiments,

Fig. 1 is an end elevational view of the device according to the invention.

Fig. 3 is a rear view of Fig. 1.

Fig. 4 is a sectional view of Fig. 2, taken along the line 4—4 thereof.

Fig. 7 is a view similar to Fig. 5, but with the sloping top and cover removed to show the interior lamp arrangement.

2

Figure 5:
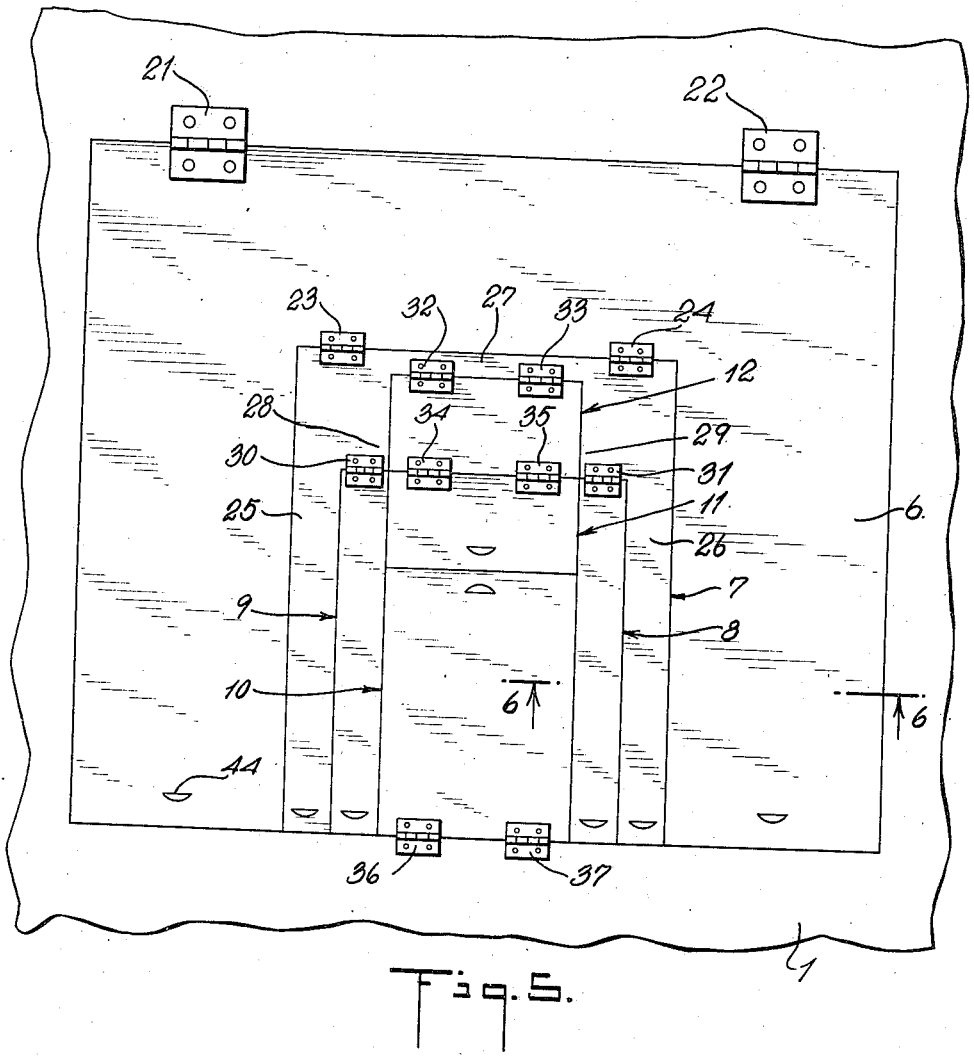
Fig. 5 is a detailed view perpendicular to the sloping front of Fig. 1.
Figure 6:
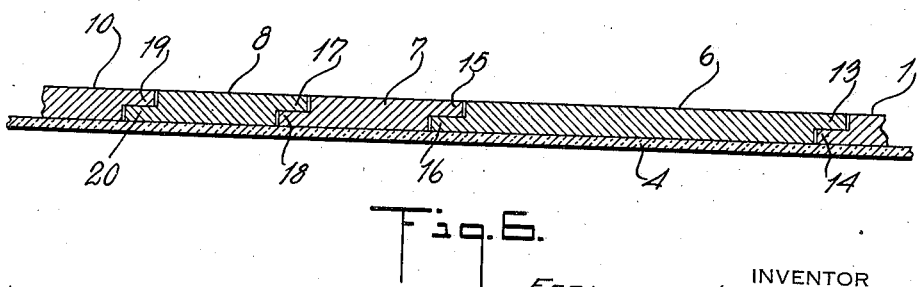
Fig. 6 is a sectional view of a portion of Fig. 5, taken along the line 6—6 thereof.
Figure 2:
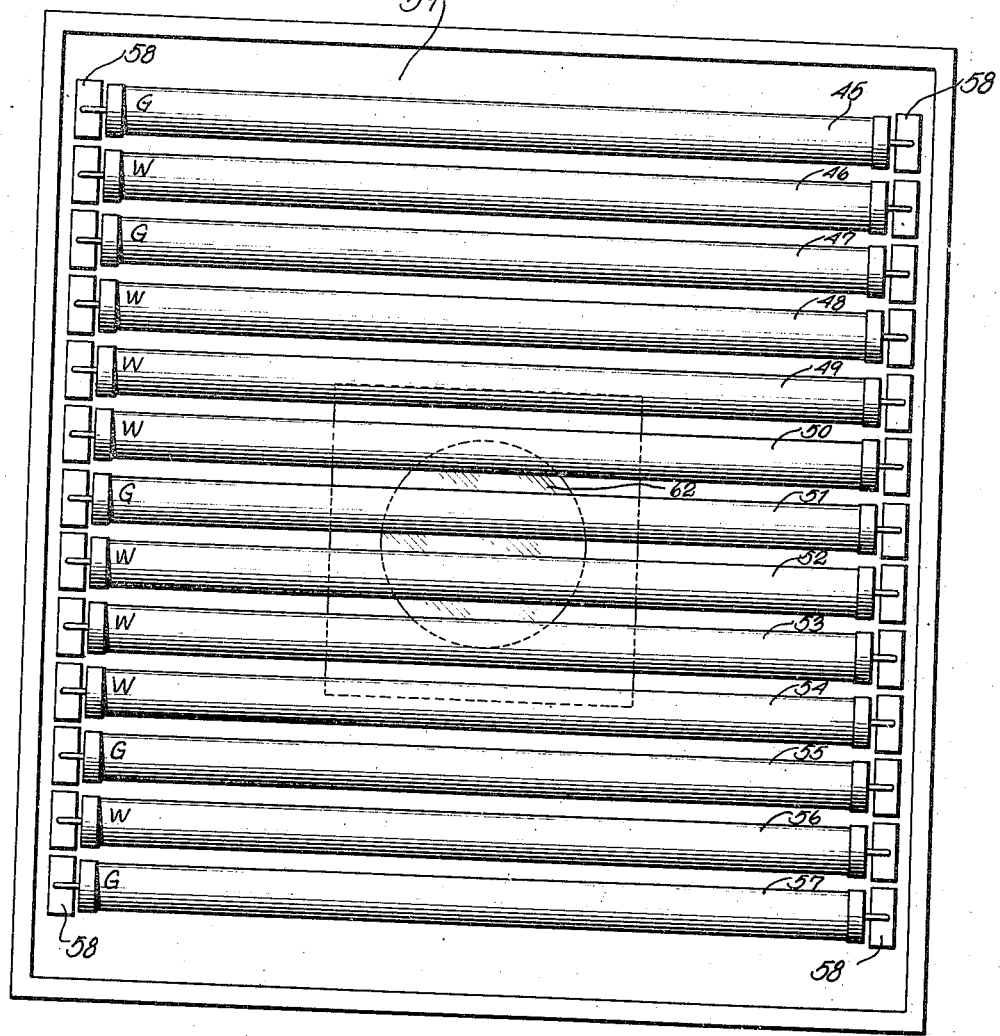
Fig. 2 is a front view of Fig. 1.

Fig. 9 is a plan view of a modification of part of the illuminating system of Fig. 7.

Fig. 10 is a front elevational view of Fig. 9.

Figs. 11 to 15 are diagrammatic views to show different shapes and locations of the viewing window to accommodate the usual standard sizes of X-ray transparencies.

As is well-known, the problem of inspecting and viewing X-ray transparencies is somewhat more critical than the examination of ordinary photographic transparencies. This may be caused, in part, by the fact that ordinary photographic negatives for example, are taken with ordinary reflected light and the matter of shadows can be relatively easily controlled by the disposition and arrangement of the light sources. However, in the case of X-ray photographs, it requires a high degree of diagnostic skill and accuracy of interpretation properly to read the significance of the various degrees of shade transparencies in the usual X-ray negative. Furthermore, in order to determine accurately the significance of certain shade gradations in an X-ray negative, it may be necessary to correlate the intensity and character of the light with the general character of the negative being examined. In some cases, it may be necessary to examine a very large negative with uniform illumination, and in other cases it may be necessary to examine a comparatively small negative with a uniform illumination.

However, in examining the smaller negative, it is usually necessary to blank off the portion of the ground glass screen which is not covered by the negative, in order that the eyes of the observer may not be disturbed by the extraneous light. Heretofore, various forms of masks and incandescent lamps have been used to illuminate the ground glass screen, and while for ordinary photographic negatives and for relatively small negatives such arrangements may be satisfactory, they are not entirely satisfactory for the proper viewing of the larger negatives. This is particularly true in the case of large X-ray negatives because it is necessary for correct interpretation, that the high intensity light be substantially uniform over the entire negative. Furthermore, when using high intensity incandescent lamps, it is necessary to position the lamps at a considerable distance from the film so that the heat of the incandescent lamps does not affect the transparencies being examined.

I have found that by using a bank of fluorescent or cold cathode luminescent elongated lamps as the source of illumination, the examination and interpretation of X-ray negatives is rendered more accurate and with the least discomfort to the observer. In the event that intense concentrated illumination is required at a particular section, these fluorescent lamps can be supplemented by a special reflector type incandescent lamp or spot lamp, the heat of which is shielded from the negative being examined.

Furthermore, I have found that in the examination of X-ray negatives, the best results are obtainable when the ground glass screen is illuminated with a mixture of fluorescent light of approximately 5000 Angstrom units and 6000 Angstrom units. These characters of light may be produced respectively by so-called green fluorescent lamps and so-called soft white fluorescent lamps, the fluorescent coatings of which are excited by ultra violet radiation generated within the bulb in the well-known manner.

Referring to the drawing, the viewer comprises a suitable opaque cabinet having a sloping front 1, connected by hinges 2 to the flat top 3 of the cabinet. The cover 1 has a large rectangular window which is closed off by a ground glass screen 4, which is suitably fastened to the cover 1. The ground glass screen is in turn provided with a variable aperture mask formed of a series of individually hinged mask members 6 to 12. The outer edges 13 of member 6 overlie the corresponding lips 14 on the window edge. Likewise, the corresponding edges 15—16, 17—18, 19—20, etc., of the respective mask members 6 to 12 overlap so that when they are all in closed position there is no leakage of light from the interior of the cabinet. Consequently, by opening the cover 1 the latter carries with it all the members 6 to 12 in order to provide easy access to the lamps within the cabinet. Likewise, by raising the member 6, said member carries with it all the remaining mask members whereby the entire ground glass section is exposed.

The various hinged members 6 to 12 are proportioned and arranged so that by opening back one or more masks, the ground glass screen will be exposed in different areas corresponding for example to the usual standard sizes of X-ray negatives. In the particular arrangement shown, by various combinations of mask openings, at least seven different standard size negatives can be viewed, as schematically illustrated by the heavy outlined rectangles in Figs. 11 to 15.

For this purpose, mask member 6 is hinged at its top edge by hinges 21, 22, to the cover 1. The member 6 has a large rectangular opening and to the upper edge of this opening there is hinged by hinges 23, 24, the mask member 7. Member 7 has two relatively narrow sides 25, 26, joined by a yoke portion 27, and having right angle shoulder portions 28, 29. Hinged by hinges 30, 31, to the horizontal edges of shoulder portions 28 and 29, are separably hinged mask members 8 and 9. Likewise, hinged at the lower edge of the yoke portion 7 by hinges 32, 33, is the mask member 12, and in turn there is hinged to the member 12 by hinges 34, 35, the mask member 11. Hinged to the lower edge of the window in cover 1 by means of hinges 36, 37, is the mask member 10. Thus, when all mask members are closed as shown in Fig. 5, the entire ground glass section is blanked off. When member 6 is opened, it carries with it all the remaining mask members as a unit. However, the members 7, 8, 9, 10, 11 and 12, can be independently hinged or raised so as to expose the ground glass screen in accordance with the particular area of negative to be examined. Thus, when member 11 is opened by itself, it exposes the screen in a relatively small substantially central area 38 (Fig. 14). When both 11 and 12 are opened, the area 39 (Fig. 15) is exposed. When member 10 alone is opened, the area 40 (Fig. 11) is exposed. Likewise, by opening various combinations of the mask members, other shapes and sizes of screen exposure are available as illustrated by the areas 41 (Fig. 12), 42 (Fig. 13), and 43 (Fig. 15).

One of the advantages of this mask arrangement is that a large negative can be placed on the ground glass screen and examined over its entire area. If however, it is desired to examine one particular portion of the negative without disturbance from the light through the remaining areas, the corresponding sections of the mask can be closed, thus confining the illumination to the particular area being examined. To facilitate opening the fixed mask sections, they may be provided with suitable finger recesses 44, or with small knobs, if desired.

In order that the screen may be uniformly illuminated regardless of which particular section is to be used for viewing, there is provided a bank of fluorescent lamps 45 to 57 of any well-known construction having suitable contact prongs at opposite ends, whereby the lamps can be plugged into suitable sockets 58. For this purpose, there is provided a removable platform 59 which is suitably supported interiorly of the cabinet on brackets (not shown) in spaced parallel relation to the panel 1. The sockets 58 are uniformly spaced and mounted on the upper face of platform 59, and if desired the usual fluorescent lamp-starting contact units 60 for the individual lamps, can be mounted underneath the platform 59 adjacent one end of the lamps outside the area covered by the ground glass screen. The usual ballast resistors or chokes 61 employed in connection with fluorescent lamps, can be mounted on the bottom of the cabinet.

The platform 59 has a central circular window or opening which is closed off by a glass plate 62. Mounted on the bottom of the cabinet in central alignment with window 62 is an incandescent lamp 63 with a special focussing reflector 64, whereby the light is concentrated on the window 62. The glass 62 acts as a heat shield to prevent the heat rays from lamp 63 affecting the fluorescent coating on lamps 49 to 54, which are immediately adjacent and above the incandescent lamp. If desired, lamps 63 and reflector 64 may be of a type ordinarily used in automobile headlamps, and the cooperating step-down transformer 65 may be attached to the bottom of the cabinet.

In the case of X-ray negatives, I have found that the best results are obtained when a combination of green fluorescent lamps and soft white fluorescent lamps are employed. Preferably, these lamps are symmetrically disposed on opposite sides of the horizontal median line of the ground glass screen. Thus, lamps 45 and 57 are green; lamps 46 and 56 are white; lamps 47 and 55 are green; lamps 48, 49, 50 and 52, 53, 54 are white; while the central lamp 51 is green. However, it may be desirable to light the lamps in various combinations. For this purpose, there are mounted on the front vertical wall of the cabinet, toggle switches 66, 67, 68, 69, 70, 71, 72. Switch 66 controls the circuit of lamps 45 and 57; switch 67 controls the circuit of lamps 46 and 56; switch 68 controls the circuit of lamps 47 and 55; switch 69 controls the circuit of lamps 48 and 54; switch 70 controls the circuit of lamps 49 and 53; switch 71 controls the circuit of lamps 50 and 52; while switch 72 controls the circuit of lamp 51. The circuit for the incandescent lamp 63 is controlled by switch 73. Thus, by manipulating the switches 66 to 73, various symmetrical combinations of lamps may be lighted in the lamp bank. Because of the low temperature operating characteristic of these fluorescent lamps, they may be located relatively close to the ground glass screen, thus providing intense and uniform illumination thereon. For the purpose of plugging-in the fluorescent lamp bank to a suitable supply line, a plug-in socket 74 is mounted on the rear wall of the cabinet. A similar plug-in socket 75 is mounted on this rear wall for supplying power to the spot incandescent lamp 63. A door 76 may be hinged to the rear wall and provided with a suitable lock 77 so that access can be had to the interior of the cabinet at any time.

Instead of using conventional straight fluorescent lamps, these lamps may be replaced by so-called cold cathode lamps, the glass tubing of which may be bent back and forth to provide a uniform and concentrated relatively cold illumination of the ground glass screen. Thus, there is shown in Fig. 9 a series of five gas-filled cold cathode tubular glass lamps 78, 79, 80, 81 and 82. These lamps instead of being zig-zagged in a single plane are bent so that successive legs 83 and 84 are located in different planes as illustrated in Fig. 10, thus providing a more uniform and concentrated illumination over a given area. The terminals and terminal equipment 85, 86 for each lamp, may be of any well-known construction and mounted on a removable platform similar to 59. In accordance with the above-noted features of the invention, the lamps 78 to 82 are of different light-producing qualities, for example lamps 78, 80 and 82 may be designed, as well-known in the cold cathode gas lamp art, to produce a green illumination, while the lamps 79 and 81 may be designed to produce a white or soft white illumination. It will be understood of course that the various lamps are connected in pairs, or individually, to respective switches similar to switch 66 to illuminate them in various desired combinations. In the event that the lamps are all to be used at the same time, their common circuit can be controlled by a switch 87 on the front of the cabinet.

It will be understood of course that the invention is not limited to any particular number of lamps in the lamp bank, and a greater or less number may be employed as desired. If desired, the interior of the cabinet may be painted white or with some other suitable reflecting paint so as to conserve the light. Likewise, the end walls of the cabinet may be provided with narrow slits 88, to allow circulation of air through the interior of the cabinet. If desired, these slits may be provided with louvres so as to reduce emerging light to a minimum.

Figure 8:
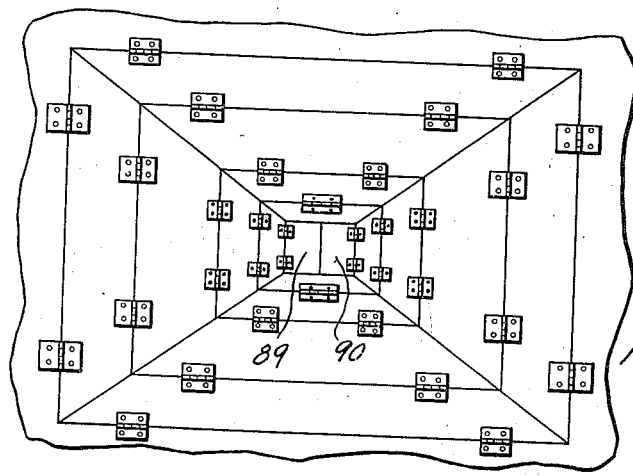
Fig. 8 represents a modification of the hinged mask of Figs. 1 to 7.

It will also be understood that the invention is not limited to the particular hinging arrangement of the mask sections, and while they are shown in the drawing as being mainly hinged at their top edges, it will be understood that the same arrangement may be used by hinging the mask at their lower edge or at their side edges. Instead of using the substantially rectangular mask members as shown, these mask members may be made in substantially trapezoidal sections which are successively hinged, with the exception of the smallest central sections 89 and 90 which may be rectangular or square as shown in Fig. 8. With this arrangement, the various mask members may be individually opened in succession to provide rectangular apertures of gradually increasing area.

Various changes and modifications may be made in the disclosed embodiment without departing from the spirit and scope of the invention. Thus, while in the embodiment of Figs. 9 and 10, the cold cathode gas lamps 78 to 82 are shown connected in series and controlled by a single switch 87, it will be understood that these lamps may be connected in parallel similar to the fluorescent lamps of Fig. 7. In that event, the lamps may be arranged in pairs or groups controlled by respective switches so as to light them in desired color combinations.

What I claim is:

1. In a device of the character described, a cabinet having a viewing screen, a bank of tubular lamps mounted beneath said screen, certain lamps producing green light and other lamps producing substantially white light, and an incandescent spot-light source within the cabinet located beneath said tubular lamps for illuminating the screen with concentrated light in a restricted area.

2. A device according to claim 1 in which a transparent heat shield is mounted between said incandescent spot-light source and said tubular lamps.

3. In a device of the character described, a light diffusing glass screen, a light source mounted adjacent one face of the screen, a variable area light mask adjacent the opposite face of the screen, said mask comprising a series of mask members of successively different size with successive members being hinged together whereby all the mask members can be opened as a unit or one or more can be be independently opened to expose the screen in predetermined areas, one of said mask members being provided with lateral side sections joined by a yoke and hinged at the outer edge of said yoke, a second member being located within said one member and hinged to the inner edge of said yoke, and a third member also located within said one member and hinged at one edge independently of the first-mentioned member, all said members when in closed position forming a unitary opaque light mask.

4. In a device of the character described, a light diffusing glass screen, a light source mounted adjacent one face of the screen, a variable area light mask adjacent the opposite face of the screen, said mask comprising a series of mask members of successively different size with successive members being hinged together whereby all the mask members can be opened as a unit or one or more can be independently opened to expose the screen in predetermined areas, two of said mask members each having lateral strips joined by a transverse yoke, said two members being located one within the other and hinged at the outer edges of their respective transverse yokes, a plurality of other hinged mask members, each located between the lateral strips of said two members, and a third hinged mask having lateral strips located between the adjacent lateral strips of the said two mask members said third mask member having a yoke member joining the lateral strips thereof said yoke member being located between the yoke members of said two mask members.

5. In an X-ray film viewer, a cabinet having a sloping front panel with a viewing screen therein, a platform mounted within the cabinet in spaced parallel relation with said screen, a plurality of tubular fluorescent lamps with cooperating contact sockets and lamp controls carried by said platform, said lamps being arranged in groups, a plurality of switches mounted on said cabinet for controlling said lamps, each switch being alloted to a particular group of lamps whereby said lamps can be lighted in desired combinations, said platform having a window provided with a light transparent heat absorbent shield, and an incandescent spot lamp being mounted beneath said shield to illuminate said screen through said fluorescent lamps.

FERNANDO J. CADENAS.

REFERENCES CITED

The following references are of record in the file of this patent:

UNITED STATES PATENTS

| Number | Name | Date |
| --- | --- | --- |
| 2,117,754 | Bell | May 17, 1938 |
| 2,306,666 | Simmon | Dec. 29, 1942 |
| 1,186,081 | Crow | June 6, 1916 |
| 1,359,510 | Kornicker | Nov. 23, 1920 |
| 1,500,867 | Glover | July 8, 1924 |
| 1,721,700 | Lancaster | July 23, 1929 |
| 1,858,755 | Van Wyck et al. | May 17, 1932 |
| 1,891,498 | Borden | Dec. 29, 1932 |
| 2,012,940 | Buck | Sept. 3, 1935 |
| 2,079,373 | Jordan | May 4, 1937 |
| 1,222,092 | Fricke | Apr. 10, 1917 |
| 1,478,504 | Adler | Dec. 25, 1923 |
| 1,868,521 | Bucky | July 26, 1932 |
| 1,988,654 | Haag | Jan. 22, 1935 |
| 2,090,989 | Van Devanter et al. | Aug. 24, 1937 |

FOREIGN PATENTS

| Number | Country | Date |
| --- | --- | --- |
| 508,278 | Germany | Jan. 13, 1929 |